United States Patent
Pohlman, Jr. et al.

(10) Patent No.: US 7,165,629 B2
(45) Date of Patent: Jan. 23, 2007

(54) PALLET PRESENTER FOR AGRICULTURAL EQUIPMENT

(75) Inventors: Frank R. Pohlman, Jr., Fort Atkinson, WI (US); Hubert Fixen, Willmar, MN (US)

(73) Assignee: Brouwer Turf Inc., Keswick (CA)

( * ) Notice: Subject to any disclaimer, the term of this patent is extended or adjusted under 35 U.S.C. 154(b) by 0 days.

(21) Appl. No.: 10/898,711

(22) Filed: Jul. 23, 2004

(65) Prior Publication Data
US 2006/0016610 A1 Jan. 26, 2006

(51) Int. Cl.
*A01B 45/04* (2006.01)

(52) U.S. Cl. .......................................... 172/20; 414/911

(58) Field of Classification Search ................. 172/19, 172/20, 33; 414/911; 111/901; 198/308.1
See application file for complete search history.

(56) References Cited

U.S. PATENT DOCUMENTS

| | | | |
|---|---|---|---|
| 3,653,448 A * | 4/1972 | Morrill ........................ 172/19 |
| 3,877,584 A | 4/1975 | Holcombe et al. |
| 4,294,316 A * | 10/1981 | Hedley et al. ................. 172/20 |
| 4,966,239 A * | 10/1990 | Hutchison ..................... 172/20 |
| 5,217,078 A * | 6/1993 | Zinn ............................. 172/19 |
| 5,269,379 A * | 12/1993 | Millar et al. ................... 172/19 |
| 2004/0188107 A1* | 9/2004 | Hendriks et al. .............. 172/20 |

FOREIGN PATENT DOCUMENTS

EP 0 467 452 1/1992
EP 1 391 146 2/2004

OTHER PUBLICATIONS

A Publication of John Deere Powder Systems, PowerSource, vol. 2, 2004.

* cited by examiner

*Primary Examiner*—Victor Batson
(74) *Attorney, Agent, or Firm*—Akin Gump Strauss Hauer & Feld, LLP

(57) ABSTRACT

Disclosed is an automatic pallet presenter for agricultural equipment. The pallet presenter has a storage magazine for storing pallets and a rotatable table mechanism for bringing pallets into a desired location.

7 Claims, 9 Drawing Sheets

PALLET PRESENTER FOR AGRICULTURAL EQUIPMENT

FIELD OF THE INVENTION

The present invention relates to an automatic pallet dispensing mechanism, and more particularly to an automatic pallet dispensing mechanism for agricultural equipment.

BACKGROUND OF THE INVENTION

For a number of years there has been an awareness of a need for automatic stacking of agricultural products at the point of collection, or harvesting. The automatic stacking of the products allow for a single equipment operator to easily harvest a large volume of produce. These harvested stacked products must be of course transported from the field in a form which allows easy transportation to distributors and end consumers. Palletized skids are therefore often used for truck transport of these agricultural products from the field to centralized distribution points.

The automated agricultural operations require the continuous packaging of a large number of such produce during any particular work shift. As such, typical agricultural operations require movement, positioning and temporary storage of large numbers of such stackable pallets at the harvesting location. Substantial distances causes problems for the movement and repositioning of both full and empty pallets or containers. Typically, empty storage pallets are moved by the farm worker into scattered positions about the harvesting locations where they can be filled either by hand or automated equipment. Due to the size and weight of these empty storage containers, significant ergonomic problems have arisen. Auto loading pallets eliminates the loss productivity and operator annoyance associated with getting out of the tractor cab each time a fresh pallet is required. Auto-stacking sod harvesters have been on the market for some time. One presently available commercial machine utilizes a stack of pallets located behind the area where the sod is loaded onto the pallet. When the pallet is full it is dropped to the ground and the sod harvesting machine pulls ahead leaving the filled pallet behind. When the machine has moved far enough ahead, a pallet dispenser pushes the bottom pallet from a stack of pallets onto the forks of the machine and another pallet proceeds to be loaded with rolls of sod.

There are several disadvantages to this method. The stack of pallets needs to be stored high enough in the air over the vehicle to clear a full pallet of sod, thus causing a high machine center of gravity. Further, the height makes it difficult to reach the pallet dispenser if it is necessary to hand load pallets into the dispenser. The height also means the vehicle's forks must be configured to regularly raise beyond where they would be for normal loading to accept an empty pallet, thus requiring the operator to stop harvesting operations while the pallet loads. This disrupts productivity. Additionally, having the dispenser behind the sod loading area contributes at least the length of the pallet to the overall length of the machine, making it less stable and maneuverable. These less maneuverable machines are harder to operate, particularly in smaller sod fields where more turnarounds are required to harvest a given area of sod. Furthermore, a long machine may require outrigger wheels to hold up the extended mechanism. Such wheels require spring loading of the wheel or hinging of the machine to allow travel over undulations and contribute extra complexity.

It is, therefore, desirable to provide an agricultural product container storage and delivery system which facilitates the delivery of fresh pallets or empty containers to an agricultural field as needed. It is also desirable to provide such a system which enables empty pallets or containers to be similarly transported to a desired location without operator or continuous service vehicle assistance. It is further desirable to provide such a system which stores empty agricultural produce containers as desired and which facilitates the storage, delivery, positioning and removal of a sufficient number of such containers to obviate the need for supplemental vehicle intervention over the entire work shift. It is also desirable to provide a system which enables agricultural workers to place containers within harvesting equipment as needed.

SUMMARY OF THE INVENTION

It is the object of the present invention to overcome the disadvantages of a rear mounted pallet dispenser as detailed above. Disclosed is an agricultural harvester with a pallet delivering system mounted to the side of the sod harvesting machine. The pallet delivery system is positioned opposite the sod cutting and handling equipment, and fully mounted on the machine. A stack of pallets is loaded into the magazine and are supported by a first set of rotatable flanges affixed on opposite sides of the magazine. Below the magazine is a pallet carrying table which is configured to be rotatable in a horizontal plane with a second set of rotatable flanges configured to drop the pallet into a loading location.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
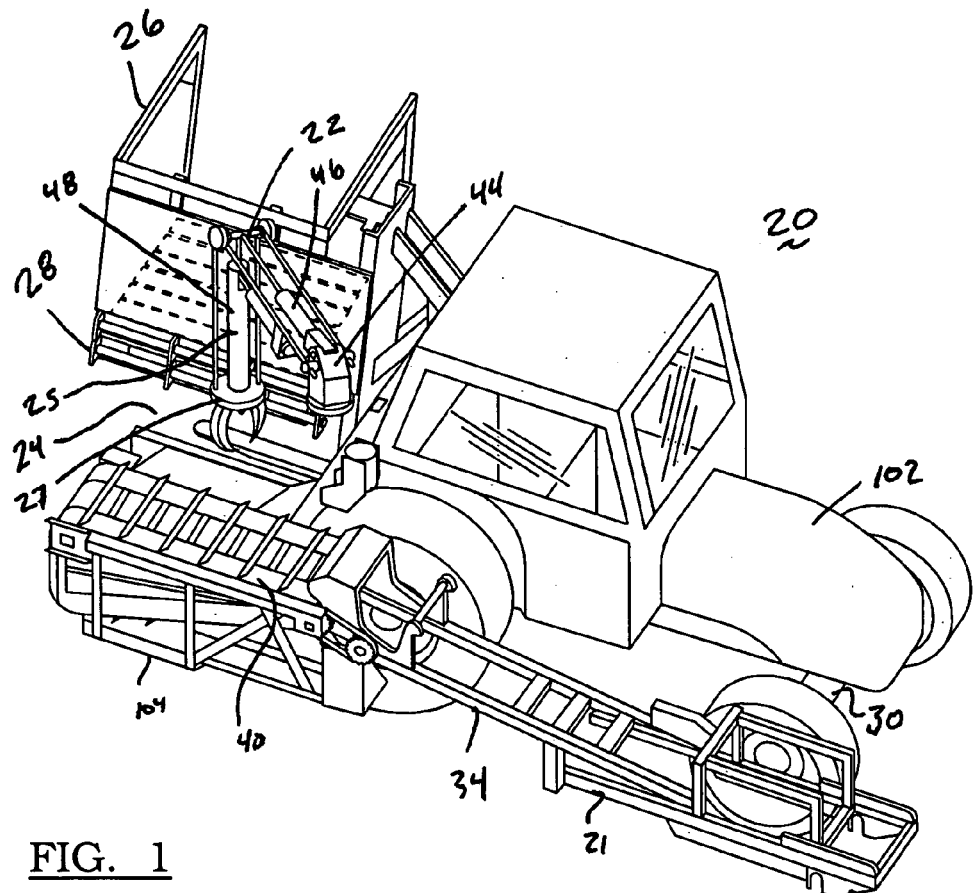
FIG. 1 represents a side view of the agricultural equipment having a pallet storage container according to the teachings of the present invention.

The following description of the preferred embodiments is merely exemplary in nature and is in no way intended to limit the invention, its application, or uses. FIG. 1 is an overall isometric view of an agricultural harvester 20 having a harvesting mechanism 21 to harvest a crop, a transportation mechanism 22 configured to transport the crop to a first storage location 24, a pallet storage container 26, and a rotatable table mechanism 28 configured to move a pallet from the pallet storage container 26 to the first location 24. The agricultural harvester 20 further has a wheeled chassis 30 for translating a sod field, and an operator occupied cab.

The transportation mechanism 22 can take the form of a robot with an articulated arm 25 and a pick-up head 27. In the context of the invention, a robot is defined as being a digitally controlled arm. Colloquially, a machine may be called a robot even if a human operator is controlling portions of its operations remotely. Reference numeral 34 designates a conveyor which delivers rolled sod to the rear of the sod harvester. The rolled sods are deposited from conveyor 34 onto an indexable accumulator conveyor 40. Accumulator conveyor 40, which is made of rubber having indexing lugs, advances every time a sod roll is moved onto it, until a sub-group of sod rolls is accumulated. At this time, a computer (not shown) controls the articulated arm 22 with pick-up head to pick up the sub-group of sod rolls and place them into a piling cavity 42. In this regard, the piling cavity 42 has a pair of actuate forks, which support a sod supporting skid, or a skidless sod stack.

The articulated arm is mounted on a base 44 for turning about a vertical axis X—X. One end of a first arm segment 46 is pivotally mounted to base 44 for turning about vertical axis X—X, and one end of a second arm segment 48 is pivotally mounted to the other end of segment 46 about a horizontal axis. A pick-up head 27 is mounted to the other end of segment 48 to turn about a vertical axis. Hydraulic cylinders drive all four of these pivoting actions. Electronic feedback tells the computer the exact location of each cylinder. The computer controls both the position and the speed of each cylinder. The computer can be programmed in a way to optimize the travel time of the pick-up head for maximum productivity.

Further, the location of the arm is controlled by the computer using pressure transducer or encoder information from the gripping forks. The information is used to sense when the rolls are starting to land on the forks or on the previous row. This feature allows the robot to compensate the position of the rolls of varying diameter, which results in layers of different thickness. By sensing a reduction in pressure when the sod starts to land on the stack reduces cycle time.

With general reference to FIGS. 1–7, shown is a sod harvester utilizing a pallet presenter according to the teachings of the present invention. The harvester 100 has a movable chassis 102 and a cabin portion 101. Disposed on the first side 103 of the harvester 100 is a harvesting mechanism 104 which is shown as a horizontal sod cutter mechanism 106. Disposed generally behind and on a second side 108 of the harvester is the pallet presenter mechanism 110. For clarity, the robotic mechanism previously disclosed which moves the rolls of sod from the harvesting mechanism 104 to the pallet has been removed. While it is envisioned that the system is operable with a robot having an articulating arm, it is equally possible to utilize the system utilizing an X-Y-Z fixed frame transport mechanism.

The presentation mechanism 110 has a pallet magazine 112 which is configured to hold a plurality of empty agricultural storage containers. Shown, the magazine 112 is configured to hold a number or stack of empty pallets. When the pallet presentation mechanism 110 is located in its harvesting position 114, three walls 116 form the pallet magazine 112. An open side 118 forms an area which is used to load empty pallets into the magazine 112. Located within the pallet magazine are a set of rotatable flanges 115 which are configured to support and lift the stack of pallets. The empty pallets can be loaded using either a standard fork lift or by hand.

Disposed on the bottom pallet magazine 112 is a rotatable table mechanism 120 which is configured to remove pallets from the magazine 112 and move them to a first loading location 122. As described below, the first loading location 122 is a position adjacent the table mechanism 120 where a pair of fork lift type forks are positioned. The first loading location 122 is at or is near where the forks are rotated to allow the disengagement of a filled pallet from the agricultural equipment.

Figure 3:
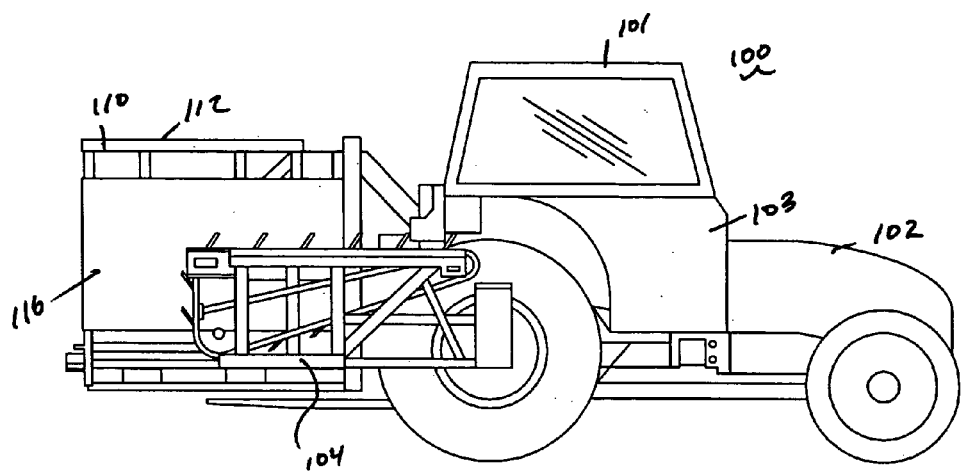
FIGS. 3 and 4 represent side and right front views of the sod harvester shown in FIG. 2.
Figure 4:
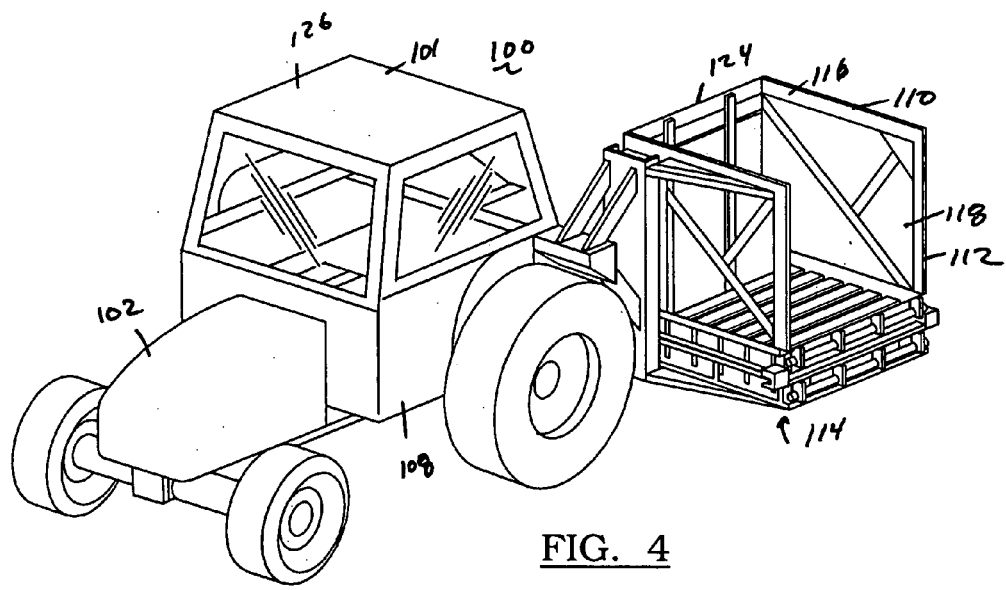
Figure 5:
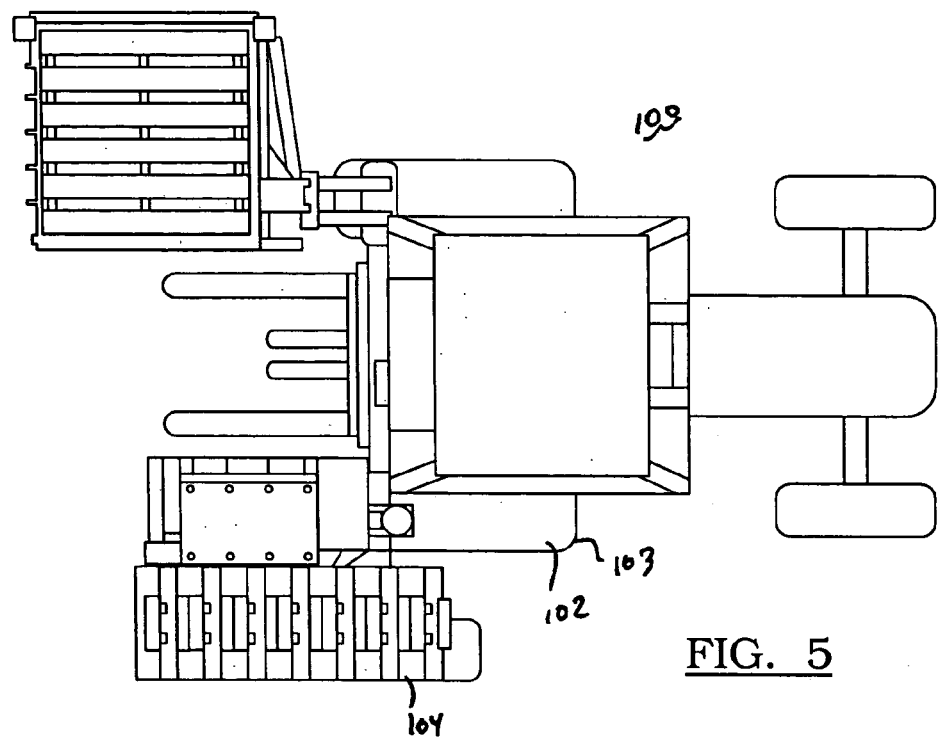
FIGS. 5–7 represent top, rear and bottom views of the sod harvester shown in FIG. 2.
Figure 6:
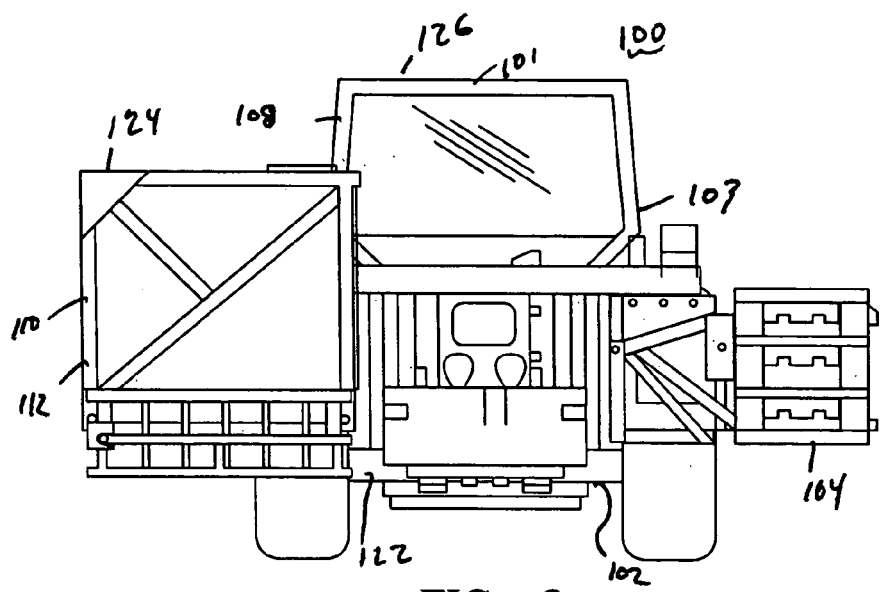
Figure 7:
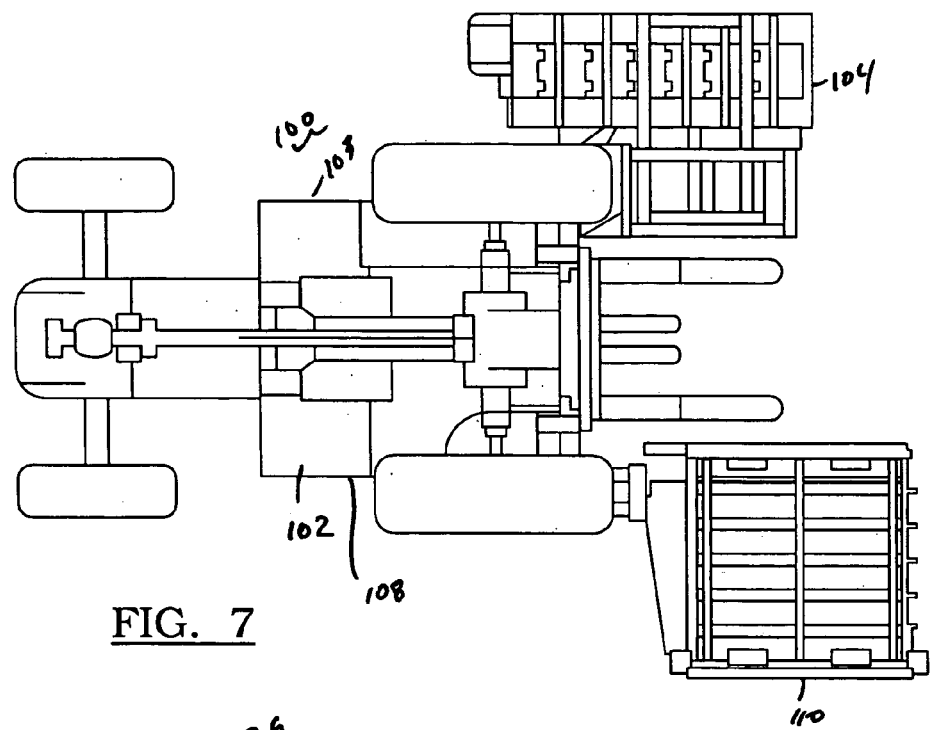

As best seen in FIGS. 3 and 5, the pallet magazine 112 has a top surface 124 which is positioned lower than the tallest position 126 of the cabin 101. This position lowers the overall center of gravity of the system and reduces the likelihood of inadvertent tipping of the equipment. Additionally as best seen in FIGS. 3 and 5, the pallet magazine 112 is stored behind the wheels 132 of the chassis 122.

Figure 2:
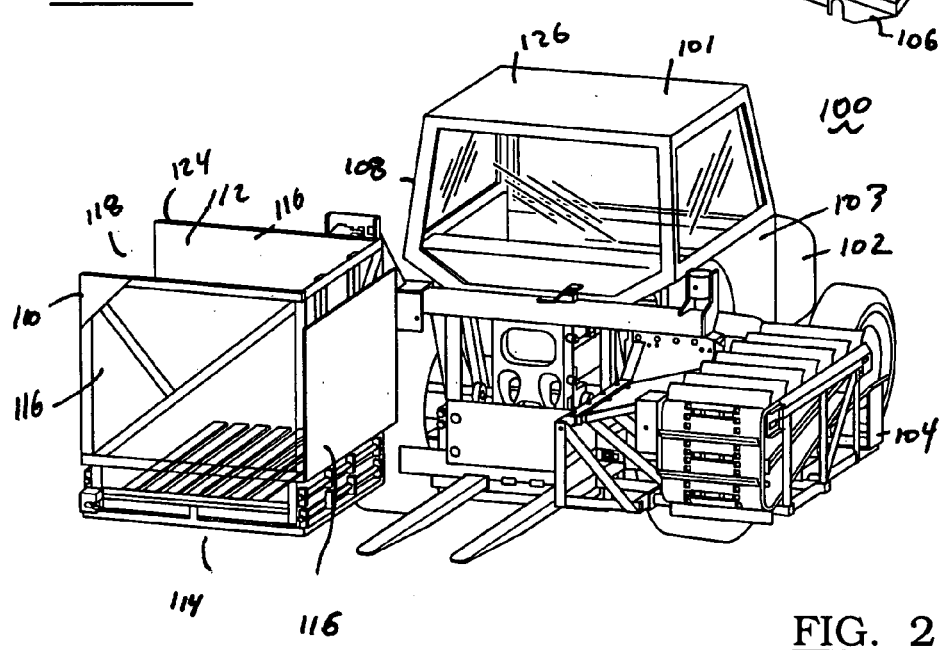
FIG. 2 represents a left rear perspective view of a sod harvester utilizing a pallet presenter according to the teachings of the present invention.
Figure 8:
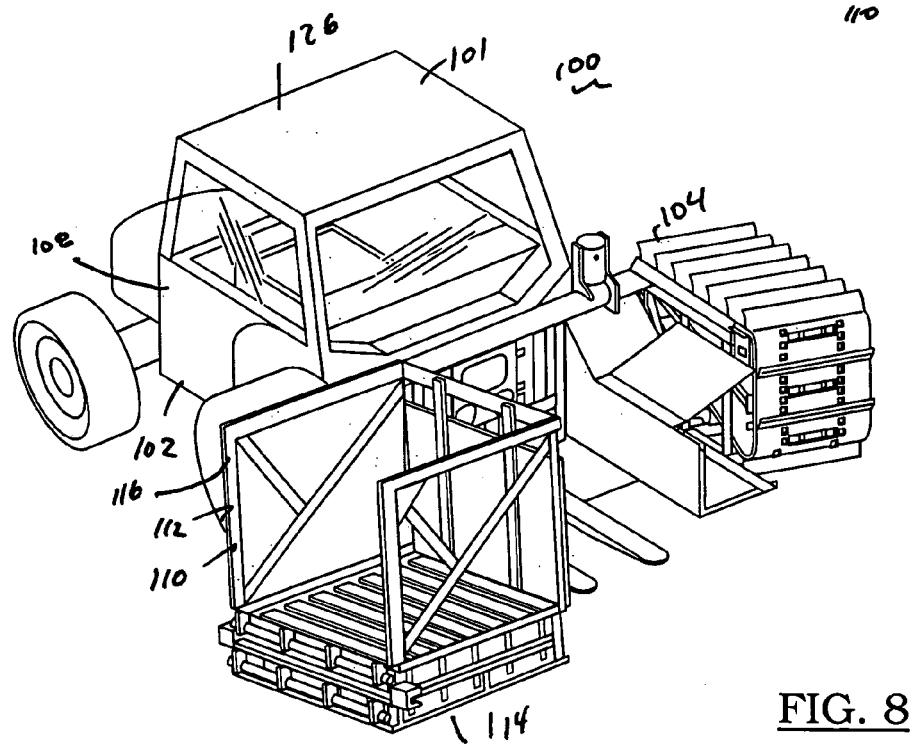
FIGS. 8 and 9 represent right rear perspective and left views of the sod harvester shown in FIG. 2.
Figure 9:
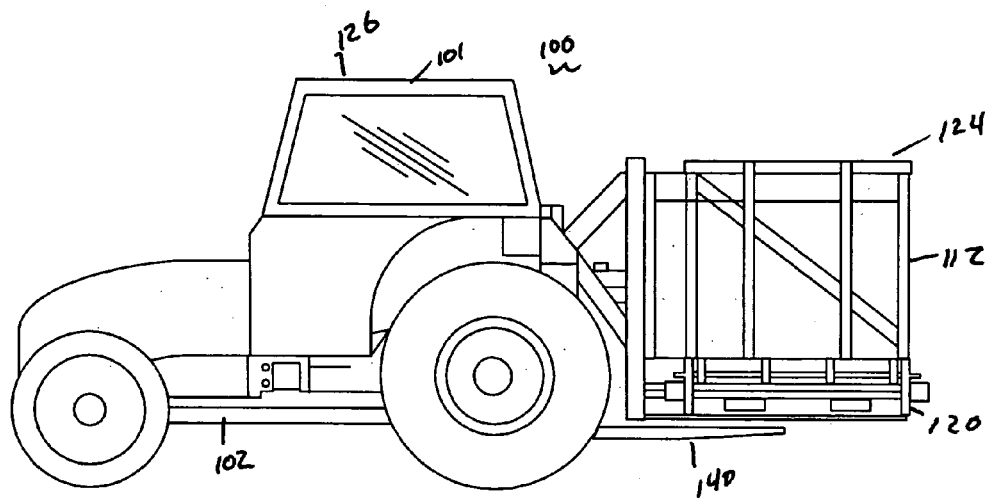

FIGS. 8 and 9 represent right rear perspective and left views of the sod harvester shown in FIG. 2. Shown is the harvesting mechanism 104 which is described in co-pending patent application Ser. No. 10/624,462 entitled Robotic Sod Stacker, filed on Jul. 22, 2003, which is herein incorporated by reference. Generally shown is an accumulator mechanism 136 which is indexed and collects rolled sod from a sod cutter (not shown). Generally, the weight and position of this mechanism offsets the weight of the pallet magazine.

Figure 10:
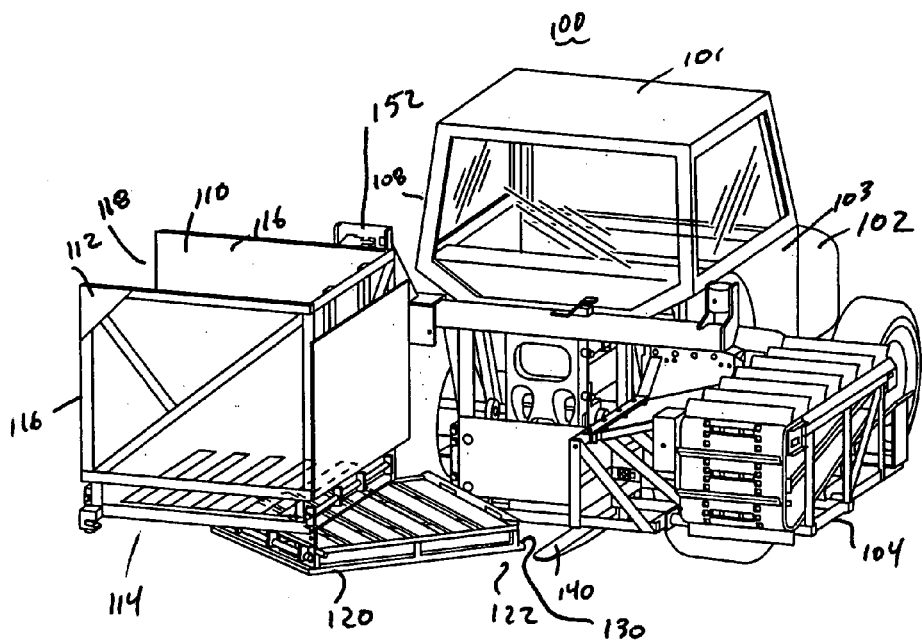
FIG. 10 represents a sod harvester shown in FIG. 2 with a pallet presenter shown in its actuated position.

FIG. 10 is a rear perspective view of the sod harvester shown in FIG. 2 with the pallet presenter shown in its semi-actuated position. As can be seen, the rotatable table mechanism 120 carries an empty skid onto the forks 140. The table mechanism 120 is rotated about a pivot point in a manner to allow the positioning of the skid in the proper orientation with respect to the forks 140. Integral to the table mechanism 120 is a pair of releasable rotatable flanges 142 which are used to suspend the empty pallet while the pallet is being moved from the magazine 112 to the first loading location 122.

Figure 11:
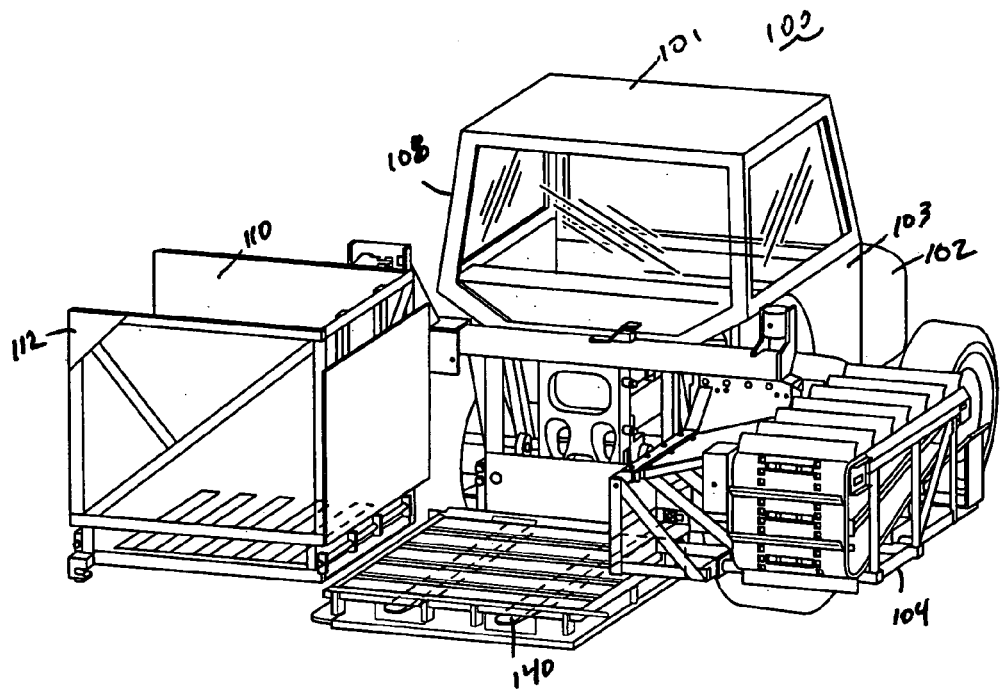
FIG. 11 represents a sod presenter shown in FIG. 2 with the pallet presenter shown in its fully actuated position.

As best seen in FIG. 11, the table mechanism 120 is configured to rotate about the pivot point to position the skid onto the forks 140. Upon releasing the skid onto the forks 140, the table mechanism 120 is configured to rotate back beneath the pallet magazine 112 and to receive another empty pallet. At this point, the system is configured to lift the pallet using the forks to its proper location for loading of the rolls of sod.

The pivot axis 152 of the rotary table mechanism 120 is located such that the pallet is centered over the pallet forks when the table mechanism 120 is rotated over the pallet forks and has the front of the pallet toward the front of the forks. When rotated under the pallet magazine 112, the side 130 of the table mechanism 120 toward the forks is located such that it, along with the magazine 112, forms a wall defining the space within which a pallet of sod is to be loaded.

The entire pallet dispensing mechanism 116 is rotatable to a working position and to a transport position. In the transport position, the entire pallet dispensing mechanism is rotated substantially within the overall width of the rest of the sod harvesting machine to reduce the width to allow for easier transport on roads, through gates and over bridges and the like than if it were fixed in place.

Figure 12:
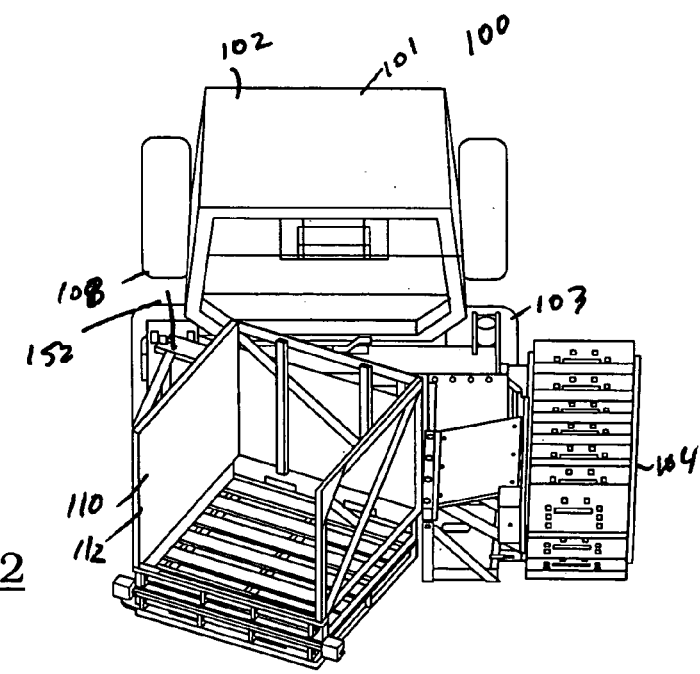
FIG. 12 represents a sod presenter shown in FIG. 2 with the pallet storage mechanism in its stored transportation position.
Figure 13:
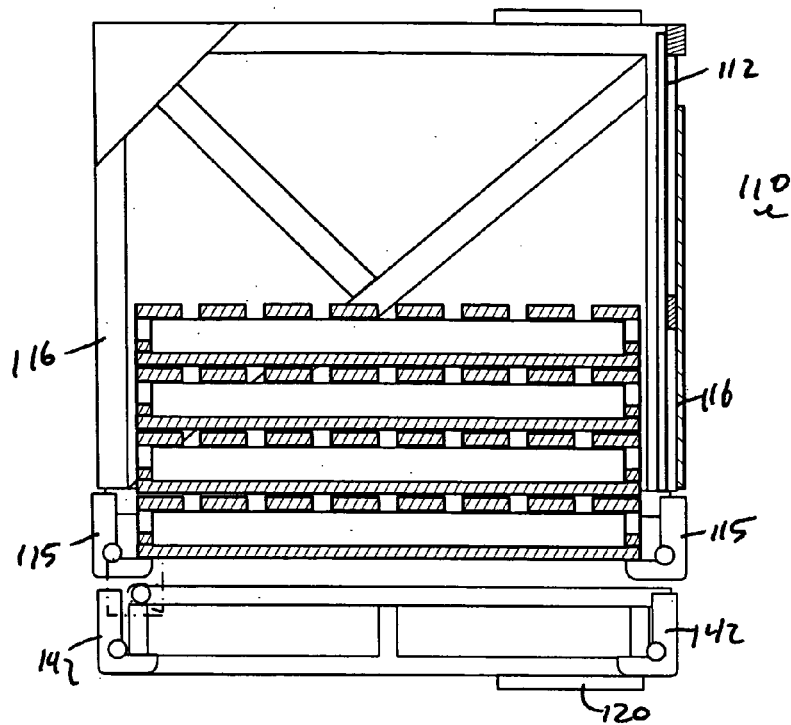
FIGS. 13–16 represent the indexing of a pallet stack.
Figure 14:
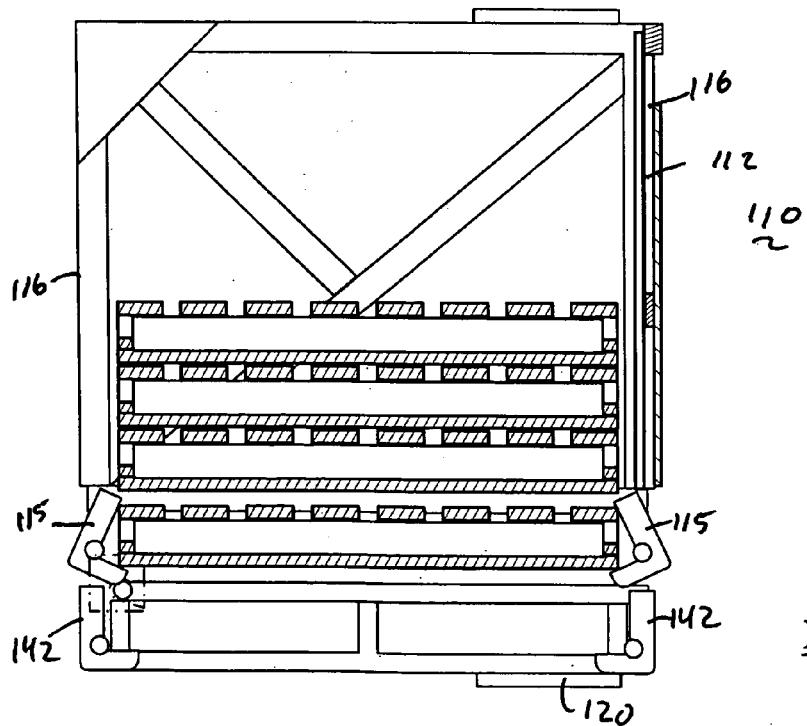
Figure 15:
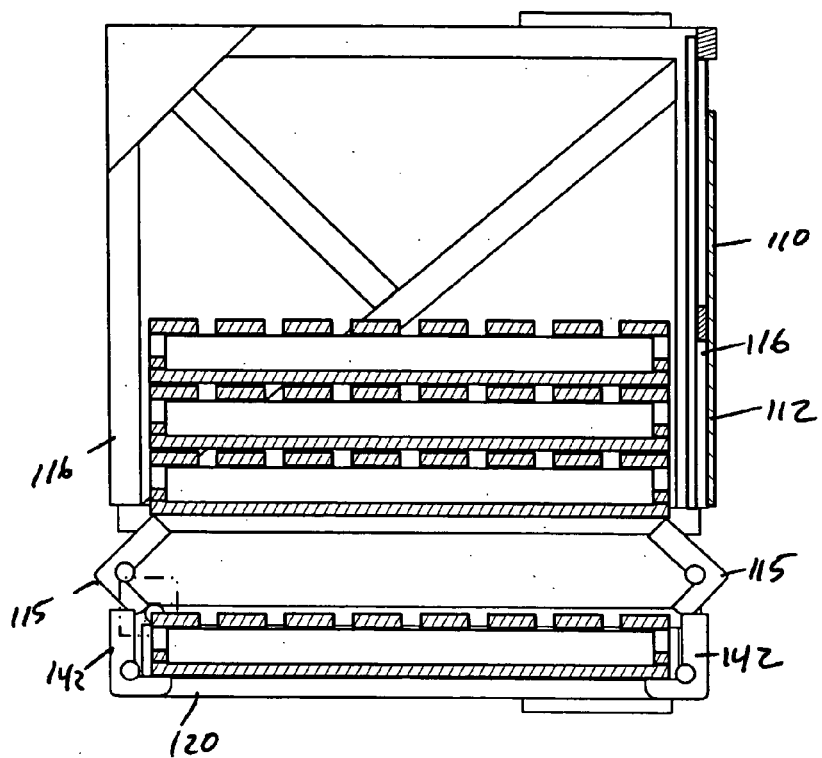
Figure 16:
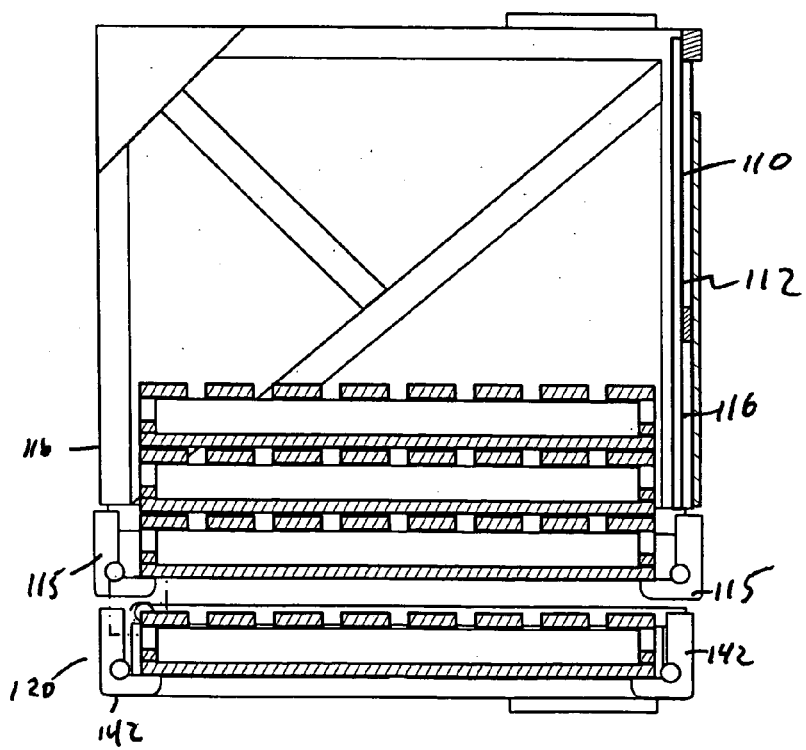

FIG. 12 represents a view of the pallet dispenser in a narrowed transport position. The entire sod presenter mechanism 110 including the pallet magazine 112 and rotatable mechanism 120 is rotated about a pivot line 152 to bring the presentation mechanism 110 between the wheels of the associated chassis 102.

The pallet dispensing mechanism is controlled by the sod harvesting machine such that when activated it goes through its cycle automatically without requiring an operator to direct each step.

Figure 17:
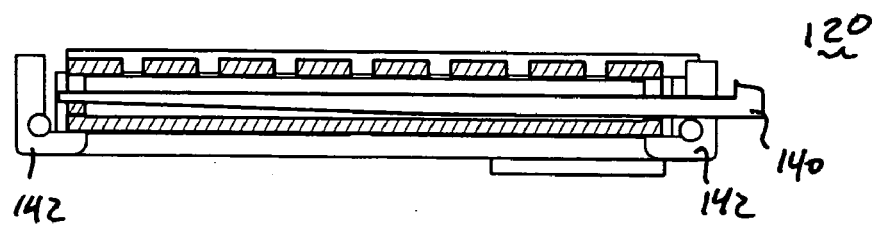
FIGS. 17 and 18 represent the actuation of the table mechanism.
Figure 18:
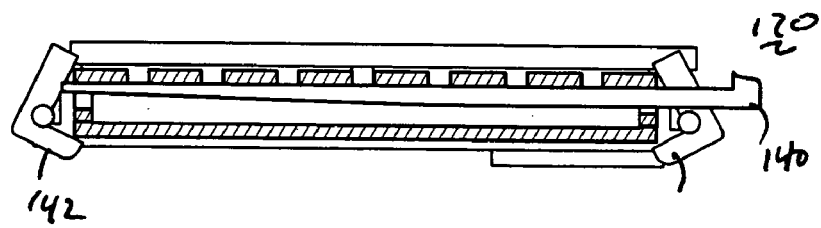

In practice, as best seen in FIGS. 13-16, a stack of pallets is loaded into the pallet magazine 112 either as a stack with a fork truck or individually, one at a time, by hand. The pallets rest on the second set of releasable flanges 115 connected to a pair of shafts in the magazine 112. The first pair of shafts are rotated to open the tray formed by the second set of flanges 115 allowing the stack of pallets to drop onto the first set of flanges 142 supported by the rotatable table 120. The shafts then rotate back to their original position. In doing so, the second flanges 115 connected to them pick up the stack of pallets as they rotate except for the bottom one which now rests on the first set of flanges 142. The pallet stack is above the bottom of the magazine portion of the pallet presentation mechanism 110, allowing clearance for the rotatable table 120 to rotate out from under the magazine 112 and over the forks of the sod harvester. As seen in FIGS. 17 and 18, when the rotatable table mechanism 120 is aligned over the pallet forks, the second set of shafts rotates to open the tray formed by the first set of flanges 142, dropping the pallet onto the forks. The table mechanism 120 then rotates back under the magazine 112 ready to start the next cycle.

When a full pallet of sod is dropped off, the forks only have to raise slightly on their way back to the stacking position to accept a pallet and would not interfere with the sod stacking arm beginning a stacking cycle. The pallet dispensing mechanism is off to the side and does not contribute to the overall length of the machine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sod harvester comprising:
a wheeled chassis for translating across a sod field;
a horizontal cutting mechanism for cutting a plurality of sod strips;
an accumulator configured to hold the sod strips;
a mechanism configured to transfer sod from the accumulator to a sod storage location;
a pallet storage container;
a rotatable table mechanism configured to transport a pallet from the pallet storage container to the sod storage location wherein the wheeled chassis comprises a pair of movable support forks, wherein the forks have a discharge position where the pallet of sod is discharged into a field, and wherein the rotatable table mechanism is configured to place an empty pallet on the forks when the forks are empty and are near the discharge location.

2. The sod harvester according to claim 1 wherein the mechanism is a robotic arm.

3. The sod harvester according to claim 1 wherein the pallet storage container is rotatable into a first location behind the wheeled chassis.

4. The sod harvester according to claim 1 wherein the accumulator is a segmented belt.

5. The sod harvester according to claim 1 wherein the pallet storage mechanism comprises an indexing mechanism configured to transport a pallet from a magazine portion to the rotatable table mechanism.

6. The sod harvester according to claim 1 wherein the rotatable table mechanism is rotatable about an axis which intersects the sod storage location.

7. The sod harvester according to claim 1 further comprising a sod rolling mechanism.

* * * * *